US008604766B2

(12) United States Patent
Shiraishi et al.

(10) Patent No.: US 8,604,766 B2
(45) Date of Patent: Dec. 10, 2013

(54) DC-DC CONVERTER AND CONTROL CIRCUIT THEREOF

(71) Applicants: Kei Shiraishi, Tokyo (JP); Takeshi Ueno, Kawasaki (JP); Taichi Ogawa, Tokyo (JP); Tetsuro Itakura, Tokyo (JP)

(72) Inventors: Kei Shiraishi, Tokyo (JP); Takeshi Ueno, Kawasaki (JP); Taichi Ogawa, Tokyo (JP); Tetsuro Itakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/692,010

(22) Filed: Dec. 3, 2012

(65) Prior Publication Data

US 2013/0249517 A1 Sep. 26, 2013

(30) Foreign Application Priority Data

Mar. 21, 2012 (JP) .................................. 2012-64482

(51) Int. Cl.
*G05F 1/59* (2006.01)
(52) U.S. Cl.
USPC .......................................................... 323/283
(58) Field of Classification Search
USPC .................. 323/272, 282–285, 351
See application file for complete search history.

(56) References Cited

U.S. PATENT DOCUMENTS

| 5,406,474 | A  | * | 4/1995  | Hansen ........................... 700/37 |
| 7,554,310 | B2 | * | 6/2009  | Chapuis et al. ............... 323/282 |
| 7,586,767 | B1 | * | 9/2009  | Prodic et al. .................... 363/65 |
| 7,782,035 | B2 | * | 8/2010  | Cheung et al. ................ 323/282 |
| 7,872,845 | B2 | * | 1/2011  | Williams et al. .............. 361/139 |
| 8,063,619 | B2 | * | 11/2011 | Zhu et al. ....................... 323/282 |
| 8,330,437 | B1 | * | 12/2012 | Hartman ........................ 323/271 |
| 8,344,712 | B2 | * | 1/2013  | Martin et al. .................. 323/272 |

OTHER PUBLICATIONS

Z.. Zhao et al; Continuous-Time Digital Controller for High-Frequency DC-DC Converters; Mar. 2008 IEEE Transactions on Power Electronics, vol. 23; pp. 564-573.

* cited by examiner

*Primary Examiner* — Adolf Berhane
(74) *Attorney, Agent, or Firm* — Holtz, Holtz, Goodman & Chick, PC

(57) ABSTRACT

A control circuit of a DC-DC converter has a voltage difference signal generator configured to generate a digital voltage difference signal depending on a voltage difference between the output voltage and a reference voltage, a PID controller configured to generate a digital PID signal for determining the duty ratio of the pulse-width modulated signal, based on the digital voltage difference signal, a phase controller configured to generate a digital phase control signal for determining a phase of the pulse-width modulated signal, based on the digital voltage difference signal, and a PWM generator configured to generate the pulse-width modulated signal, based on the digital PID signal and the digital phase control signal.

20 Claims, 10 Drawing Sheets

DC-DC CONVERTER AND CONTROL CIRCUIT THEREOF

CROSS REFERENCE TO RELATED APPLICATIONS

This application is based upon and claims the benefit of priority from the prior Japanese Patent Application No. 2012-64482, filed on Mar. 21, 2012, the entire contents of which are incorporated herein by reference.

FIELD

Embodiments of the present invention relate to a digitally-controlled DC-DC converter and a control circuit thereof.

BACKGROUND

A digitally-controlled DC-DC converter has been widely used for the purpose of low power consumption, semiconductor integration, etc. In the digitally-controlled DC-DC converter, a pulse-width modulated signal having a duty ratio depending on the voltage difference between an output voltage and a reference voltage is generated by a DPWM circuit, a square wave voltage is generated by switching an input voltage based on this pulse-width modulated signal, and the output voltage is generated by smoothing the generated square wave voltage by a lowpass filter.

It is not easy to broaden the signal band of the digitally-controlled DC-DC converter. This is because the signal band must be limited to a low-frequency range which is less influenced by the delay occurring in ADC, DPWM circuit, etc. arranged in the digitally-controlled DC-DC converter.

Since the DPWM circuit generates a pulse-width modulated signal based on a result obtained by comparing a digital ramp wave signal with a duty signal, a delay time is generated between the input and output of the DPWM circuit, depending on the sampling frequency of the digital ramp wave signal and the duty ratio of the duty signal. When a load variation occurs while a delay is caused in the DPWM circuit, the output voltage cannot be controlled quickly and the output voltage greatly varies.

As a technique to prevent such a defect, it is suggested to switch to TOC (Time-Optimal Control) control when a load variation occurs, in order to recover the output voltage quickly. However, it is required to correctly grasp the element values of inductor, capacitor, etc. in the DC-DC converter to realize highly-accurate control. Since the element values change depending on environmental conditions such as temperature, it is difficult to perform highly-accurate control.

DETAILED DESCRIPTION

According to one embodiments, a control circuit of a DC-DC converter is provided. The DC-DC converter generates a square wave voltage by periodically switching an input voltage based on a duty ratio depending on a pulse-width modulated signal, and converting this square wave voltage into a direct-current output voltage by a lowpass filter. The control circuit has a voltage difference signal generator configured to generate a digital voltage difference signal depending on a voltage difference between the output voltage and a reference voltage;

a PID controller configured to generate a digital PID signal for determining the duty ratio of the pulse-width modulated signal, based on the digital voltage difference signal;

a phase controller configured to generate a digital phase control signal for determining a phase of the pulse-width modulated signal, based on the digital voltage difference signal; and a PWM generator configured to generate the pulse-width modulated signal, based on the digital PID signal and the digital phase control signal.

Embodiments will now be explained with reference to the accompanying drawings.

(First Embodiment)

Figure 1:
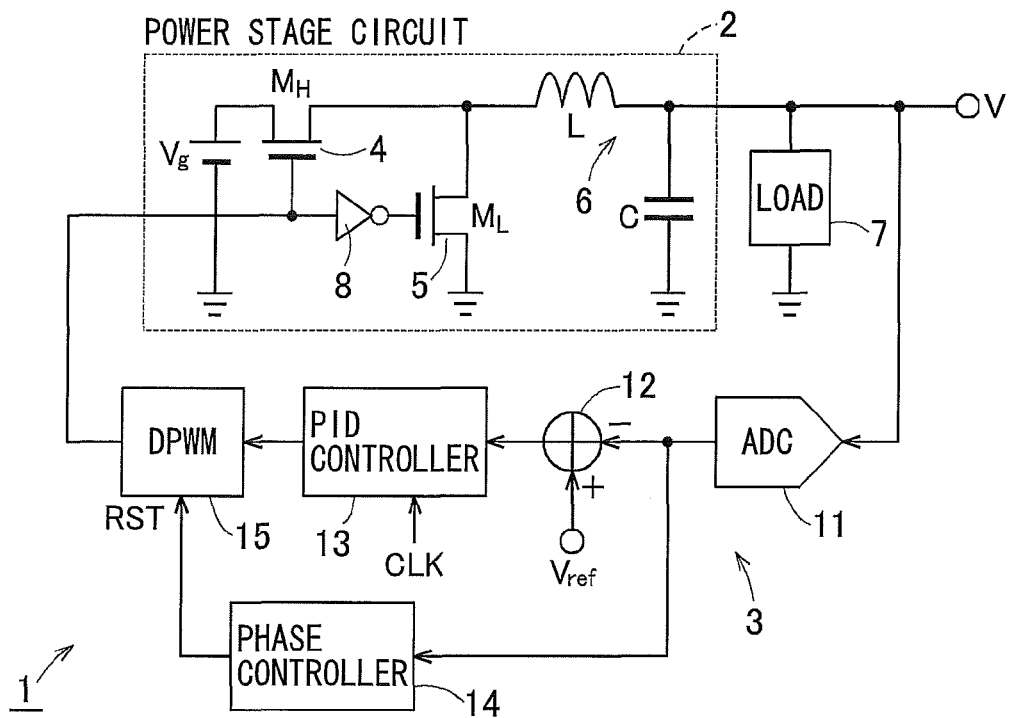
FIG. 1 is a circuit diagram showing a schematic configuration of a DC-DC converter 1 according to a first embodiment.

FIG. 1 is a circuit diagram showing a schematic configuration of a DC-DC converter 1 according to a first embodiment. The DC-DC converter 1 of FIG. 1 has a power stage circuit 2 and a control circuit 3. The power stage circuit 2 has a High-side switch 4 and a Low-side switch 5 each of which generates a square wave voltage by periodically switching an input voltage based on a duty ratio depending on a pulse-width modulated signal, and a lowpass filter 6 which smoothes the square wave voltage to generate an output voltage. A load 7 is connected between a ground line and the output terminal of the power stage circuit 2.

A pulse-width modulated signal (hereinafter referred to as a PWM signal) outputted from the control circuit 3 is inputted to the gate of the High-side switch 4. A signal obtained by inverting the PWM signal by an inverter 8 is inputted to the gate of the Low-side switch 5.

The drain of the High-side switch 4 is applied with the input voltage, and the source thereof is connected to the input terminal of the lowpass filter 6 and to the drain of the Low-side switch 5. The source of the Low-side switch 5 is grounded.

The lowpass filter 6 has an inductor L connected between the drain of the High-side switch 4 and the output terminal of the power stage circuit 2, and a capacitor C connected between this output terminal and a ground line.

The control circuit 3 has an A/D converter (hereinafter referred to as an ADC) 11, a comparator (voltage difference signal generator) 12, a PID controller 13, a phase controller 14, and a PWM generator (hereinafter referred to as a DPWM) 15.

The ADC 11 converts the output voltage outputted from the power stage circuit 2 into a digital output voltage signal. The comparator 12 generates a digital voltage difference signal corresponding to a voltage difference between the output voltage and a reference voltage, based on the digital output voltage signal.

The PID controller 13 generates a digital PID signal for determining the duty ratio of the PWM signal, based on the digital voltage difference signal. More specifically, the PID controller 13 performs a proportional control calculation, an integral control calculation, and a differential control calculation, based on the digital voltage difference signal, and generates a digital PID signal by synthesizing the results obtained through the calculations.

The phase controller 14 generates a digital phase control signal for determining a phase of the PWM signal, based on the digital voltage difference signal.

As stated above, in the present embodiment, the phase of the PWM signal is determined by the phase controller 14, and the duty of the PWM signal is determined by the PID controller 13.

Figure 2:
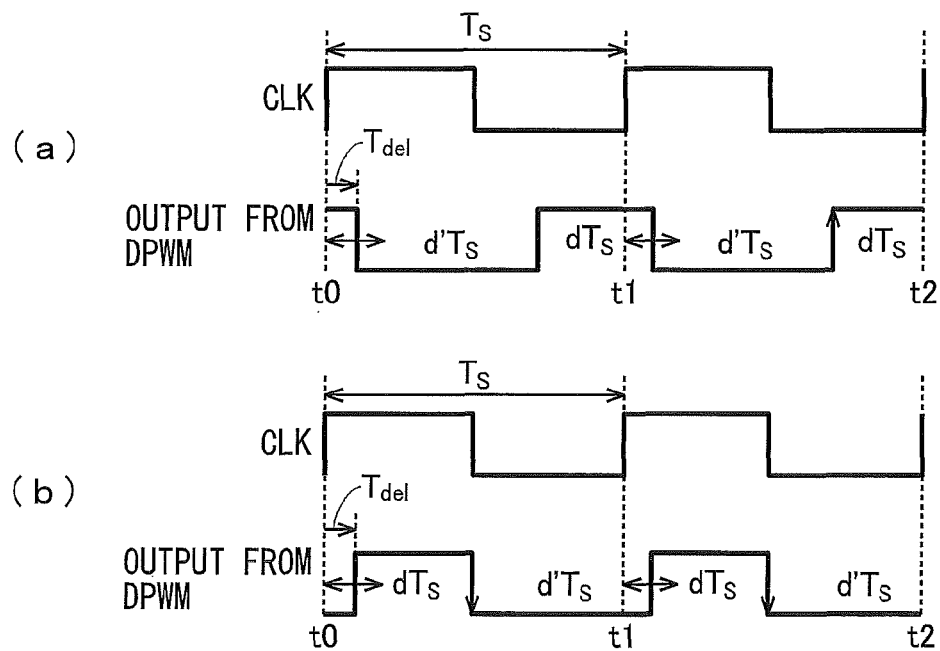
FIGS. 2(a) and 2(b) show waveform diagrams of a PWM signal outputted from a DPWM 15 of FIG. 1.

FIGS. 2(*a*) and 2(*b*) show waveform diagrams of the PWM signal outputted from the DPWM 15 of FIG. 1. FIG. 2(*a*) shows an example of changing the falling edge timing of the PWM signal depending on the digital PID signal. FIG. 2(*b*) shows an example of changing the rising edge timing of the PWM signal depending on the digital PID signal.

Each of FIG. 2(*a*) and FIG. 2(*b*) is characterized in that delay time from the rising edge of a clock signal CLK to the falling edge or rising edge of the PWM signal is short.

When a load variation occurs, the output voltage correspondingly changes and the magnitude of the digital PID signal also changes. Then, pulse width of the PWM signal is adjusted so that the output voltage returns to the original voltage level. For example, in the case of FIG. 2(*a*), the falling edge timing of the PWM signal is changed depending on load variation, while in the case of FIG. 2(*b*), the rising edge timing of the PWM signal is changed depending on load variation.

As will be explained in detail later, which one of the falling edge timing and the rising edge timing should be changed depending on load variation is determined based on the digital PID signal. In the present specification, changing the falling edge timing of the PWM signal is referred to as trailing edge modulation, and changing the rising edge timing of the PWM signal is referred to as leading edge modulation.

As stated above, in the present embodiment, any one of the trailing edge modulation and the leading edge modulation is selected based on the digital PID signal in order to shorten the delay time from the rising edge of the clock signal to the falling edge or rising edge of the PWM signal, which makes it possible to quickly restrain a change in the output voltage due to a load variation while improving responsiveness to load variation.

The delay time from the rising edge of the clock signal to the falling edge or rising edge of the PWM signal is controlled by the digital phase control signal generated by the phase controller 14. The phase controller 14 controls the delay time of the PWM signal in view of the magnitude of the digital voltage difference signal.

The phase controller 14 sets the delay time shown in FIG. 2 with a slight leeway, in view of a change in the digital PID signal due to noise.

As stated above, in the first embodiment, the phase controller 14 controls the delay time from the rising edge of the clock signal to the rising edge of the PWM signal in order to shorten the delay time as much as possible, which makes it possible to make the output voltage quickly return to the original voltage when a load variation occurs, while improving responsiveness to load variation.

In particular, control in the present embodiment is performed using only the information about load variation, without using element values of the inductor, capacitor, etc. in the DC-DC converter 1, which makes it possible to improve responsiveness to load variation without depending on environmental conditions such as temperature.

(Second Embodiment)

A second embodiment explained below is characterized in generating the PWM signal by using two kinds of sawtooth wave signals.

Figure 3:
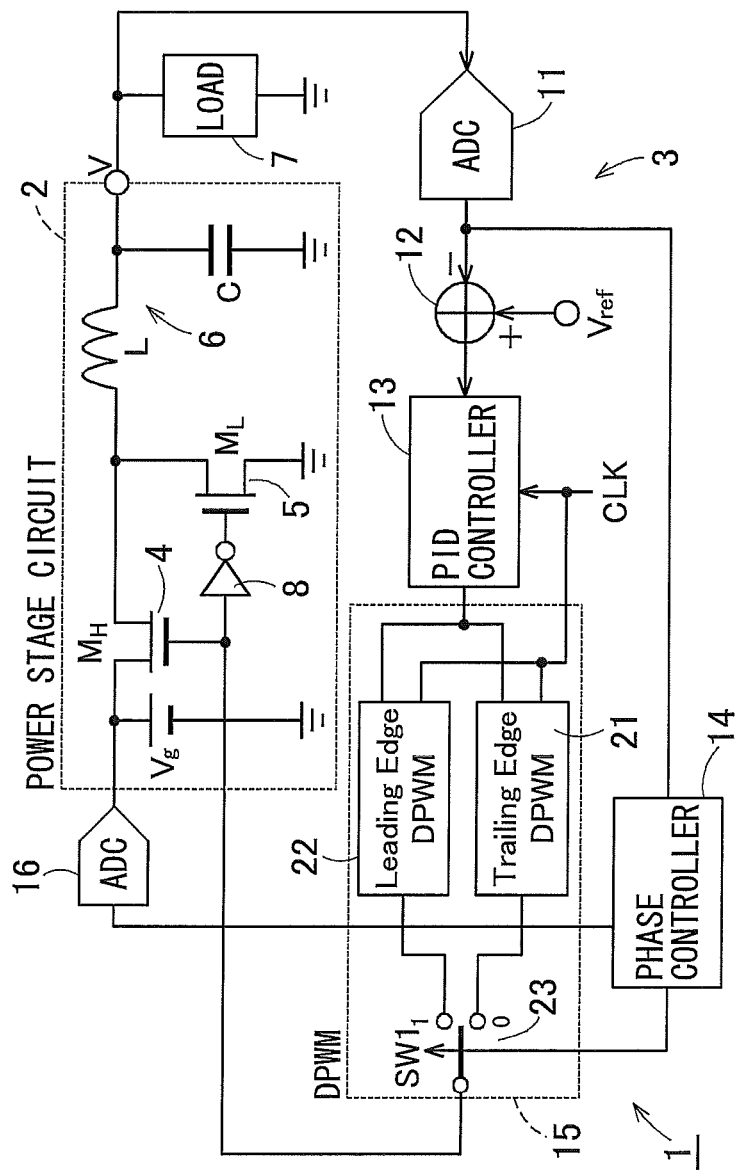
FIG. 3 is a block diagram showing a schematic configuration of the DC-DC converter 1 according to a second embodiment.

FIG. 3 is a block diagram showing a schematic configuration of the DC-DC converter 1 according to the second embodiment.

In FIG. 3, the same components as those in FIG. 1 are given the same symbols, and differences therebetween will be mainly explained.

In the DC-DC converter 1 of FIG. 3, the internal configuration of the DPWM 15 of FIG. 1 is shown in a more concrete manner. The DPWM 15 of FIG. 3 has a trailing edge DPWM (first comparator) 21, a leading edge DPWM (second comparator) 22, and a PWM selector 23.

The trailing edge DPWM 21 generates a first PWM candidate signal by comparing signal levels of the digital PID signal and a first sawtooth wave signal having trailing edges. The leading edge DPWM 22 generates a second PWM candidate signal by comparing signal levels of the digital PID signal and a second sawtooth wave signal having leading edges.

The PWM selector 23 selects any one of the first PWM candidate signal and the second PWM candidate signal, based on the digital phase control signal, and the selected signal becomes the PWM signal.

Since the PWM signal outputted from the PWM selector 23 is a digital signal, the PWM signal is converted into an analog PWM signal by an A/D converter (hereinafter referred to as an ADC) 16 and supplied to the power stage circuit 2.

Figure 4:
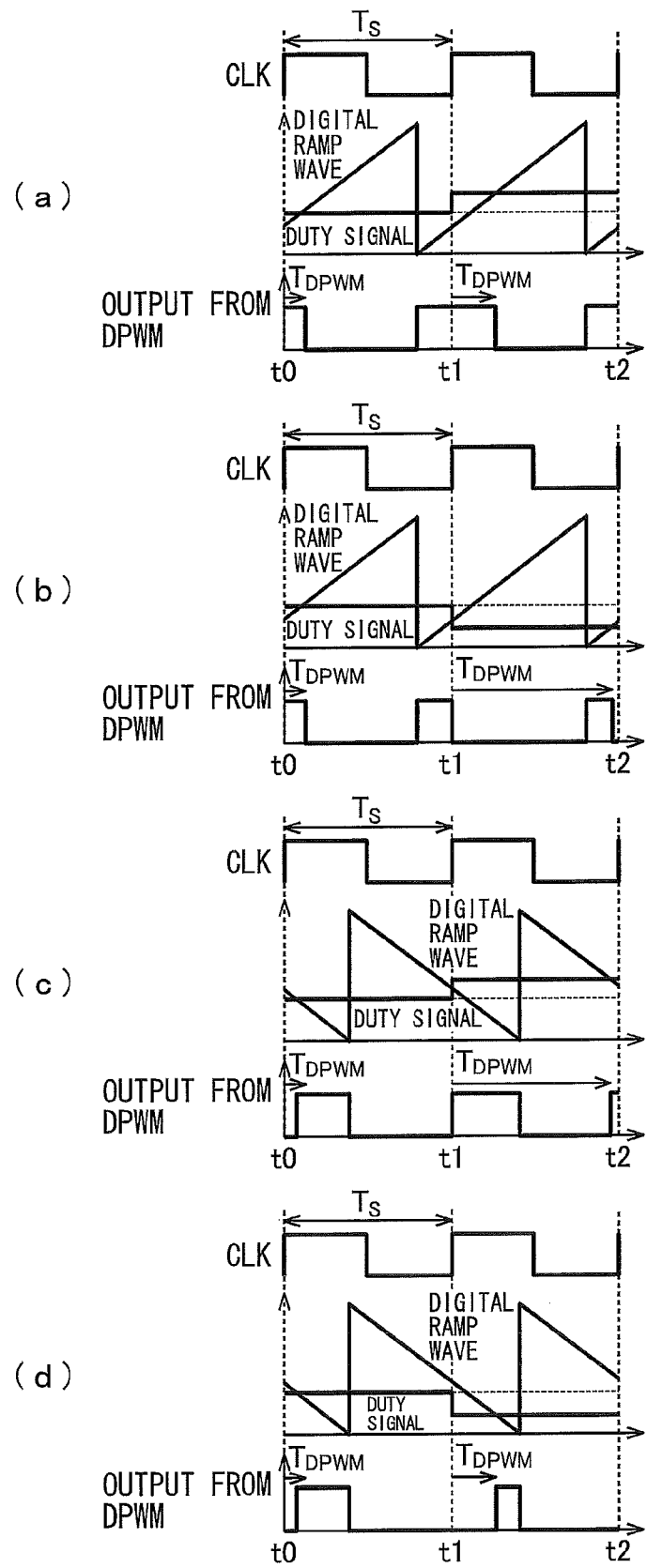
FIGS. 4(a) to 4(d) show timing waveform diagrams of the DC-DC converter 1 of FIG. 3.

FIGS. 4(*a*) and 4(*b*) show timing waveform diagrams of the DC-DC converter 1 of FIG. 3. FIG. 4(*a*) shows an example of trailing edge modulation performed when load current decreases. When load current decreases, the output voltage increases and the digital PID signal also becomes large. In this case, the trailing edge DPWM 21 adjusts the phase of the first sawtooth wave signal so that the signal level of the first sawtooth wave signal is slightly below that of the digital PID signal in vicinity of the rising edge of the clock signal CLK.

As shown in FIG. 4(*a*), the falling edge of the PWM signal appears after a slight delay time TDPWM since the rising edge of the clock signal CLK has appeared, thereby the trailing edge modulation being performed. In the next cycle (Time t1 to t2), the signal level of the digital PID signal becomes high, and the delay time TDPWM becomes a little long correspondingly. As stated above, when load current decreases, the delay time TDPWM can be kept short by the trailing edge modulation, which means that the trailing edge modulation is effective in this case.

FIG. 4(b) shows an example of trailing edge modulation performed when load current increases. When load current increases, the output voltage decreases and the digital PID signal also becomes small. In this case, the trailing edge DPWM 21 adjusts the phase of the first sawtooth wave signal so that the signal level of the first sawtooth wave signal is slightly below that of the digital PID signal in vicinity of the rising edge of the clock signal CLK. As shown in FIG. 4(b), the falling edge of the PWM signal appears after a slight delay time TDPWM since the rising edge of the clock signal CLK has appeared, thereby the trailing edge modulation being performed. In the next cycle (Time t1 to t2), the signal level of the digital PID signal becomes low, and the delay time TDPWM becomes considerably long correspondingly. As stated above, when load current increases, the delay time TDPWM sometimes becomes extremely long, which means that the trailing edge modulation is not effective in this case.

FIG. 4(c) shows an example of leading edge modulation performed when load current decreases. When load current decreases, the output voltage rises and the digital PID signal also becomes large. In this case, the leading edge DPWM 22 adjusts the phase of the second sawtooth wave signal so that the signal level of the second sawtooth wave signal is slightly above that of the digital PID signal in vicinity of the rising edge of the clock signal CLK. As shown in FIG. 4(c), the rising edge of the PWM signal appears after a slight delay time TDPWM since the rising edge of the clock signal CLK has appeared, thereby the leading edge modulation being performed. In the next cycle (Time t1 to t2), the signal level of the digital PID signal becomes low, and the delay time TDPWM becomes considerably long correspondingly. As stated above, when load current decreases, the delay time TDPWM sometimes becomes extremely long, which means that the leading edge modulation is not effective in this case.

FIG. 4(d) shows an example of leading edge modulation performed when load current increases. When load current increases, the output voltage falls and the digital PID signal also becomes small. In this case, the leading edge DPWM 22 adjusts the phase of the second sawtooth wave signal so that the signal level of the second sawtooth wave signal is slightly above that of the digital PID signal in vicinity of the rising edge of the clock signal CLK. As shown in FIG. 4(d), the rising edge of the PWM signal appears after a slight delay time TDPWM since the rising edge of the clock signal CLK has appeared, thereby the leading edge modulation being performed. In the next cycle (Time t1 to t2), the signal level of the digital PID signal becomes low, and the delay time TDPWM becomes slightly long correspondingly. As stated above, when load current increases, the delay time TDPWM does not become extremely long, which means that the leading edge modulation is effective in this case.

In short, the trailing edge modulation is effective when load current decreases, while the leading edge modulation is effective when load current increases. Therefore, the phase controller 14 detects the increase or decrease in load current based on the digital voltage difference signal, and instructs the PWM selector 23 to select the trailing edge modulation in the case of increase, and to select the leading edge modulation in the case of decrease.

As stated above, in the second embodiment, the trailing edge modulation and the leading edge modulation can be selectively used depending on whether load current increases or decreases, by providing the trailing edge DPWM 21 for performing the trailing edge modulation by utilizing the first sawtooth wave signal having trailing edges, the leading edge DPWM 22 for performing the leading edge modulation by utilizing the second sawtooth wave signal having leading edges, and the PWM selector 23 for selecting any one of the outputs from the DPWMs 21 and 22. Accordingly, delay time when generating the PWM signal can be shortened, and responsiveness to load variation can be improved.

(Third Embodiment)

A third embodiment explained below is characterized in configurating the DPWM 15 using a digital counter.

Figure 5:
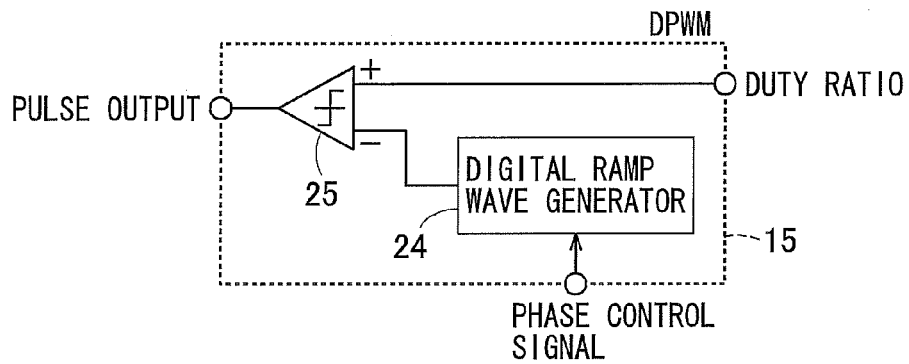
FIG. 5 is a block diagram showing an example of the internal configuration of the DPWM 15 applicable to the DC-DC converter 1 according to the first and second embodiments.

FIG. 5 is a block diagram showing an example of the internal configuration of the DPWM 15 applicable to the DC-DC converter 1 according to the first and second embodiments. The DPWM 15 of FIG. 5 has a digital ramp wave generator 24 for generating a digital ramp wave signal, and a comparator 25 for comparing the digital PID signal with the digital ramp wave signal.

The digital ramp wave generator 24 is configured by using, e.g., a digital counter, and its count value is cleared by the digital phase control signal from the phase controller 14 to return to the initial value.

Figure 6:
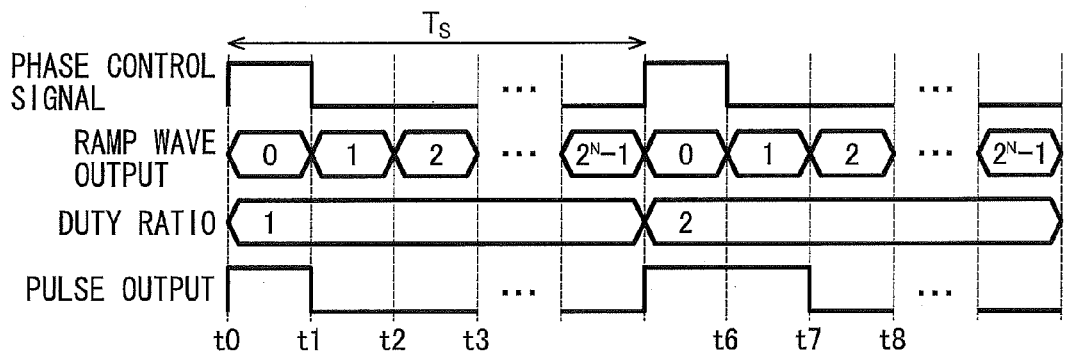
FIG. 6 is a timing waveform diagram of the DPWM 15 shown in FIG. 5.

FIG. 6 is a timing waveform diagram of the DPWM 15 shown in FIG. 5. At the time point when the digital phase control signal becomes High, the digital ramp wave generator 24 is cleared and returns to the initial value, and then counts up from the initial value. The comparator 25 compares the digital PID signal with the count value counted up by the digital ramp wave generator 24, and if both of them are consistent with each other, outputs a pulsed PWM signal.

In the example shown in FIG. 6, the count value becomes 0 at the time point when the digital phase control signal becomes High, for simplification. However, the initial value from which counting is started should not necessarily be 0, and counting up is started from the initial value which is set at the time point when the digital phase control signal becomes High.

The DPWM 15 of FIG. 5 can be applied to the DPWM 15 of FIG. 1, and the trailing edge DPWM 21 and the leading edge DPWM 22 of FIG. 3. More specifically, the trailing edge DPWM 21 can be made using an up counter, while the leading edge DPWM 22 can be made using a down counter.

As stated above, in the third embodiment, since the DPWM 15 is configured using a digital counter, the DPWM 15 can be made with a simple digital circuit using a gate and a flip-flop, and can be easily mounted on a chip.

(Fourth Embodiment)

A fourth embodiment explained below is characterized in generating the PWM signal using a delay unit, instead of using the sawtooth wave signals.

Figure 7:
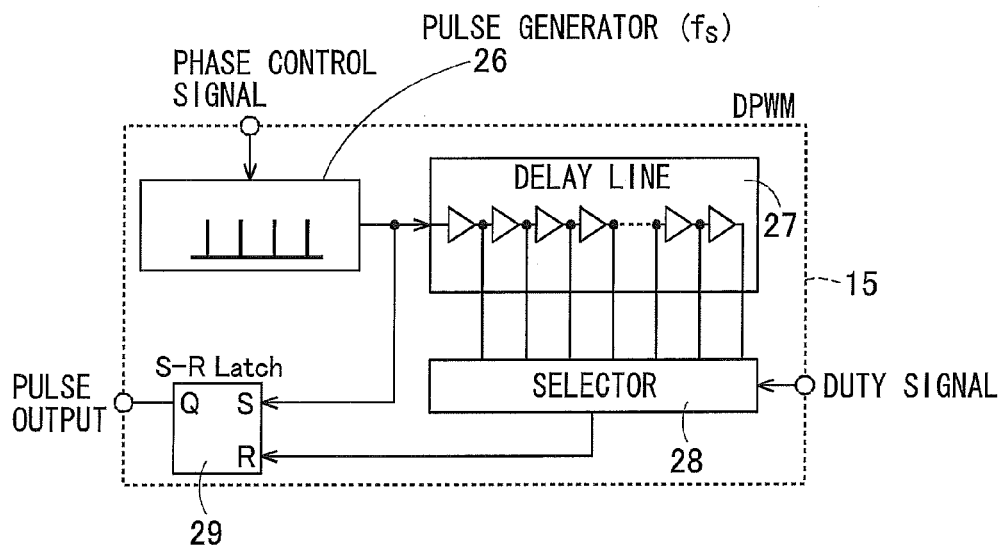
FIG. 7 is a block diagram showing an example of the internal configuration of the DPWM 15 applicable to the DC-DC converter 1 according to the first and second embodiments.

FIG. 7 is a block diagram showing an example of the internal configuration of the DPWM 15 applicable to the DC-DC converter 1 according to the first and second embodiments. The DPWM 15 of FIG. 7 has a pulse generator 26, a delay unit (delay line) 27, a selector 28, and an S-R latch 29.

The pulse generator 26 generates a pulse signal having a phase depending on the digital phase control signal. The delay unit 27 sequentially delays the pulse signal by a plurality of delay circuits connected in series, and a plurality of pulse delay signals each having a different amount of delay are outputted from the delay circuits. The selector 28 selects one of the pulse delay signals, based on the digital PID signal.

The S-R latch 29 generates the PWM signal by utilizing edges of the pulse signal and edges of the pulse delay signal selected by the pulse selector. More specifically, the pulse signal is inputted at the set terminal of the S-R latch 29, and the pulse delay signal selected by the pulse selector is inputted at the reset terminal of the S-R latch 29. Therefore, the S-R latch 29 sets the PWM signal to High at the time point when the pulse signal becomes High, and sets the PWM signal to Low at the time point when the pulse delay signal selected by the pulse selector becomes High. In this way, the timing to set the PWM signal to Low is controlled by the digital phase control signal.

The DPWM 15 of FIG. 7 can be applied to the DPWM 15 of FIG. 1, and the trailing edge DPWM 21 and the leading edge DPWM 22 of FIG. 3.

As stated above, in the fourth embodiment, since the DPWM 15 is configured by the pulse generator 26, the delay unit 27, the selector 28, and the S-R latch 29, the DPWM 15 can be easily made with a simple digital circuit and can be easily mounted on a chip, similarly to the third embodiment.

(Fifth Embodiment)

A fifth embodiment explained below is characterized in the internal configuration of the DPWM 15 and the phase controller 14.

Figure 8:
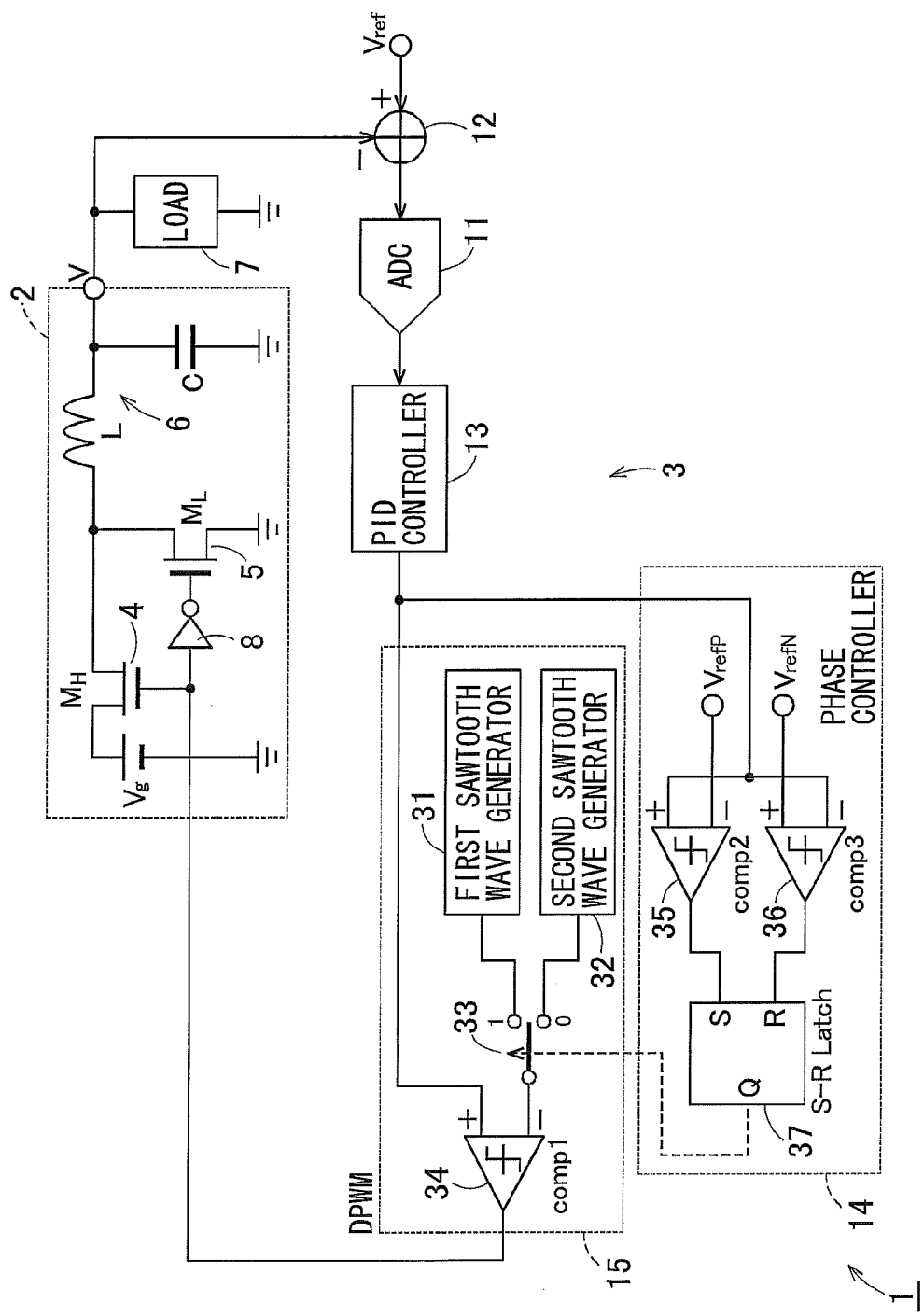
FIG. 8 is a block diagram showing the internal configuration of the DC-DC converter 1 according to a fifth embodiment.

FIG. 8 is a block diagram showing the internal configuration of the DC-DC converter 1 according to the fifth embodiment.

The DPWM 15 in the DC-DC converter 1 of FIG. 8 has a first sawtooth wave generator 31 for generating a first sawtooth wave signal having trailing edges, a second sawtooth wave generator 32 for generating a second sawtooth wave signal having leading edges, a sawtooth wave selector 33 for selecting any one of the first sawtooth wave signal and the second sawtooth wave signal, and a sawtooth wave comparator 34 for generating the PWM signal by comparing the digital PID signal with the sawtooth wave signal selected by the sawtooth wave selector 33.

The phase controller 14 has a first threshold value comparator 35 for generating a first threshold value comparative signal showing whether the digital PID signal is a first threshold value or greater, a second threshold value comparator 36 for generating a second threshold value comparative signal showing whether the digital PID signal is a second threshold value or less, the second threshold value being smaller than the first threshold value, and an S-R latch (phase control signal generator) 37.

The first threshold value comparative signal is inputted at the set terminal of the S-R latch 37, and the second threshold value comparative signal is inputted at the reset terminal of the S-R latch 37.

When the digital PID signal is the first threshold value or greater, the phase controller 14 instructs the sawtooth wave selector 33 to select the first sawtooth wave signal, and then the first sawtooth wave signal is continuously selected until the digital PID signal becomes the second threshold value or less. When the digital PID signal becomes the second threshold value or less, the phase controller 14 instructs the sawtooth wave selector 33 to select the second sawtooth wave signal, and then the second sawtooth wave signal is continuously selected until the digital PID signal becomes the first threshold value or greater.

As stated above, in the fifth embodiment, the digital PID signal is compared to two kinds of threshold values arranged in the phase controller 14 to select any one of the first sawtooth wave signal and the second sawtooth wave signal. Accordingly, when a load variation occurs, the PWM signal can be generated by selecting an optimum sawtooth wave signal having excellent responsiveness to load variation from the first sawtooth wave signal and the second sawtooth wave signal.

Note that the phase controller 14 of FIG. 8 can be applied to the phase controller 14 explained in the first to third embodiments. Accordingly, also in the first to third embodiments, an optimum sawtooth wave signal having excellent responsiveness to load variation can be selected.

(Sixth Embodiment)

A sixth embodiment explained below is characterized in adjusting the amount of delay of the first sawtooth wave signal and the second sawtooth wave signal, based on the digital PID signal.

Figure 9:
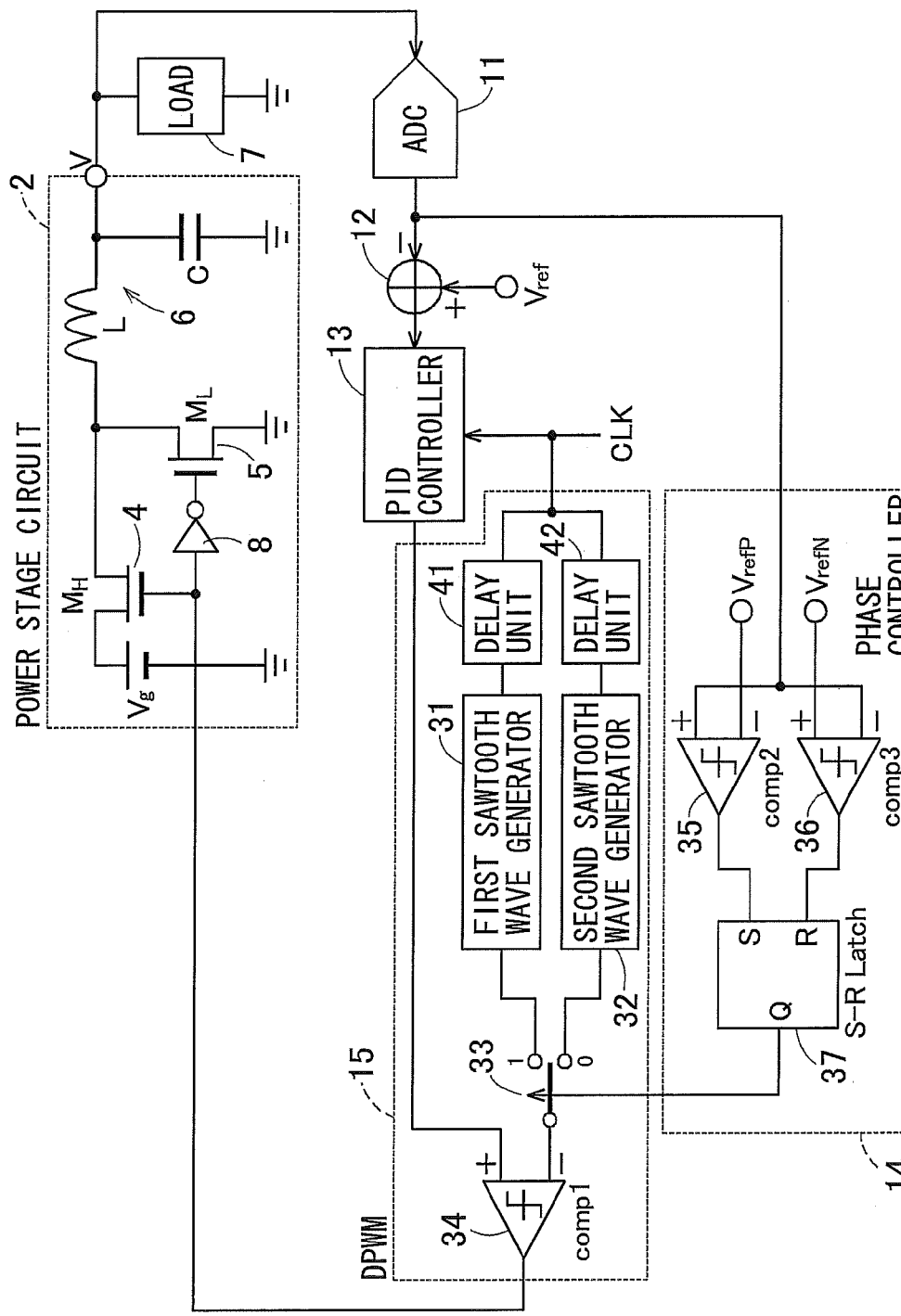
FIG. 9 is a block diagram showing the internal configuration of the DC-DC converter 1 according to a sixth embodiment.

FIG. 9 is a block diagram showing the internal configuration of the DC-DC converter 1 according to the sixth embodiment.

The internal configuration of the phase controller 14 in the DC-DC converter 1 of FIG. 9 is similar to that of the phase controller 14 of FIG. 8. The DPWM 15 in the DC-DC converter 1 of FIG. 9 has a first delay unit 41 for delaying the clock signal CLK by a first delay time, a second delay unit 42 for delaying the clock signal CLK by a second delay time, the first sawtooth wave generator 31 for generating a first sawtooth wave signal having trailing edges in synchronization with the clock signal CLK delayed by the first delay unit 41, the second sawtooth wave generator 32 for generating a second sawtooth wave signal having leading edges in synchronization with the clock signal CLK delayed by the second delay unit 42, the sawtooth wave selector 33 for selecting any one of the first sawtooth wave signal and the second sawtooth wave signal, and the sawtooth wave comparator 34 for generating the PWM signal by comparing the digital PID signal with the sawtooth wave signal selected by the sawtooth wave selector 33.

The DPWM 15 adjusts the phases of the first sawtooth wave signal and the second sawtooth wave signal by setting the first delay time and the second delay time depending on the magnitude of the digital PID signal. Accordingly, it is possible to control the first sawtooth wave signal so as to become slightly smaller than the digital PID signal in vicinity of the rising edge of the clock signal as shown in FIG. 4(*a*), and it is also possible to control the second sawtooth wave signal so as to become slightly larger than the digital PID signal in vicinity of the rising edge of the clock signal as shown in FIG. 4(*d*).

Figure 10:
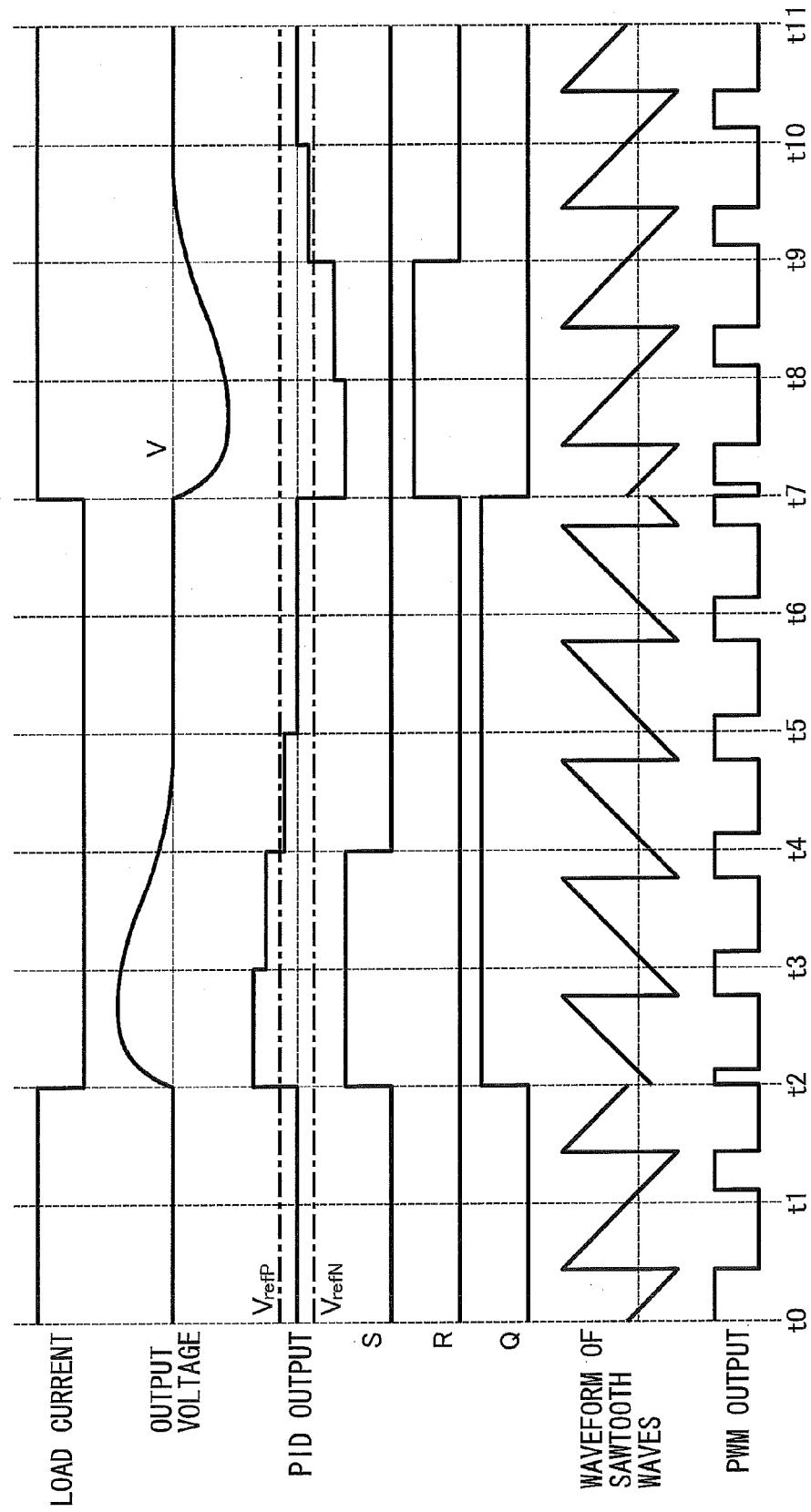
FIG. 10 is a timing waveform diagram of the DC-DC converter 1 of FIG. 9.

FIG. 10 is a timing waveform diagram of the DC-DC converter 1 of FIG. 9. FIG. 10 shows an example where load current decreases from Time t2 to t7, and increases from Time t7 to t11. As shown in FIG. 10, when load current decreases, the output voltage largely rises temporarily, and then falls to settle at a specified voltage (Time t2 to t7). Further, when load current increases, the output voltage largely falls temporarily, and then rises to settle at a specified voltage (Time t7 to t11).

The digital PID signal changes depending on the output voltage. From Time t2 to t7, during which load current decreases, the digital PID signal has the maximum value from Time t2 to t3, and then gradually falls (Time t3 to t7). Further, from Time t7 to t11, during which load current increases, the digital PID signal has the minimum value from Time t7 to t8, and then gradually rises (Time t8 to t11).

When load current decreases at Time t2, the first threshold value comparator 35 in the phase controller 14 outputs the first threshold value comparative signal indicating that the digital PID signal has become the first threshold value or greater. Accordingly, the phase controller 14 instructs the sawtooth wave selector 33 to select the first sawtooth wave signal generated by the first sawtooth wave generator 31 in the DPWM 15. Once the first sawtooth wave signal is selected, the first sawtooth wave signal is continuously selected until the digital PID signal becomes the second threshold value or less. Thus, from Time t2 to t7 in FIG. 10, the first sawtooth wave signal is continuously selected.

In FIG. 10, from Time t2 to t7, the PWM signal rises at the same timing as the falling edge of the first sawtooth wave signal having trailing edges, and the falling edge position of the PWM signal changes depending on the magnitude relation between the first sawtooth wave signal and the digital PID signal. The delay time from each of Time t2, t3, . . . , t7 indicating the rising edge positions of the clock signal to the falling edge of the PWM signal is short, which shows excellent responsiveness to load variation.

After that, when load current increases at Time t7, the second threshold value comparator 36 in the phase controller 14 outputs the second threshold value comparative signal indicating that the digital PID signal has become the second threshold value or less. Accordingly, the phase controller 14 instructs the sawtooth wave selector 33 to select the second sawtooth wave signal generated by the second sawtooth wave generator 32 in the DPWM 15. Once the second sawtooth wave signal is selected, the second sawtooth wave signal is continuously selected until the digital PID signal becomes the first threshold value or greater. Thus, from Time t7 to t11 in FIG. 10, the second sawtooth wave signal is continuously selected.

In FIG. 10, from Time t7 to t11, the PWM signal falls at the same timing as the rising edge of the second sawtooth wave signal having leading edges, and the rising edge position of the PWM signal changes depending on the magnitude relation between the second sawtooth wave signal and the digital PID signal. The delay time from each of Time t2, t3, . . . , t7 indicating the rising edge positions of the clock signal to the rising edge of the PWM signal is short, which shows that responsiveness to load variation is excellent.

Figure 11:
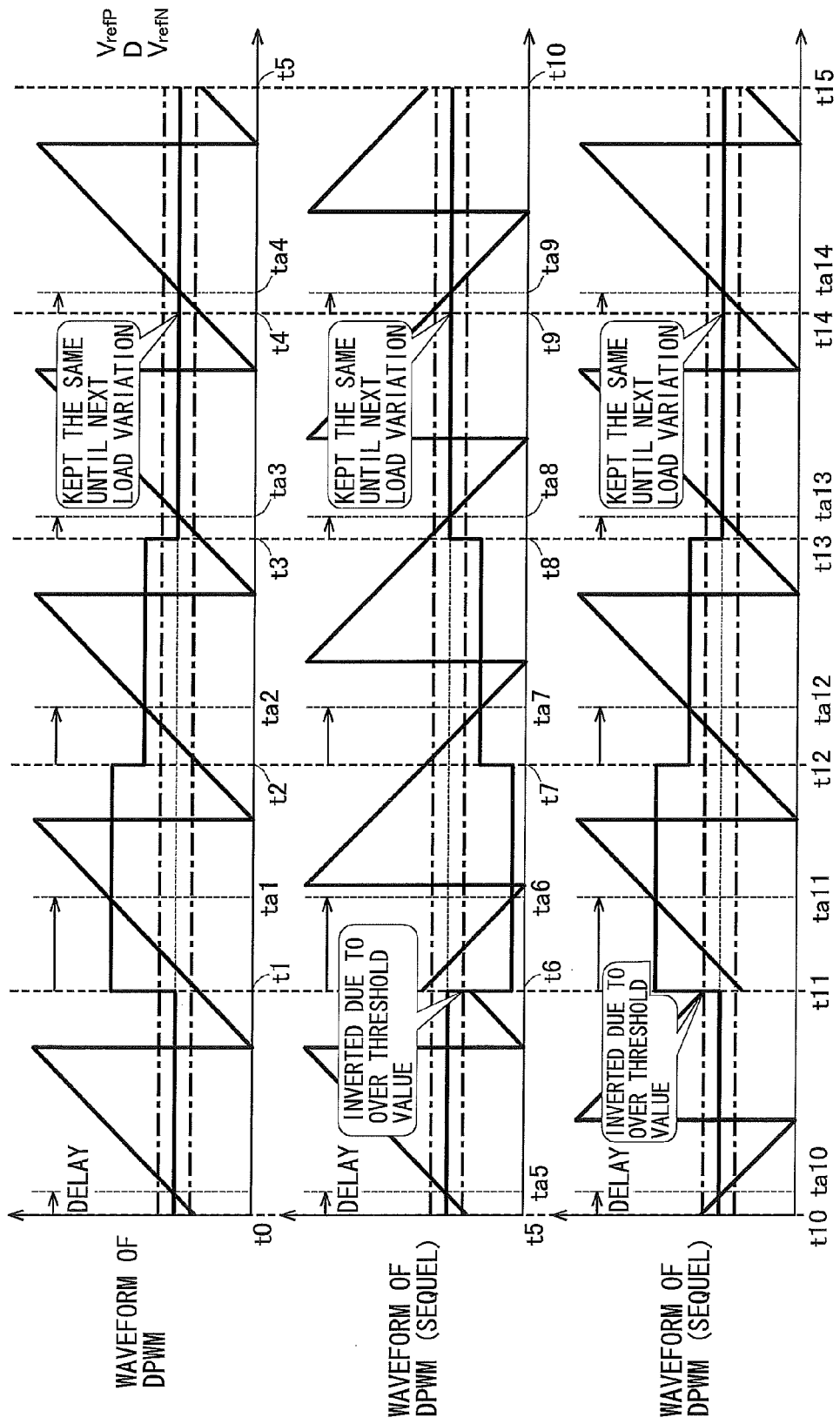
FIG. 11 is a timing waveform diagram of the DC-DC converter 1 of FIG. 9, as an example different from FIG. 10.

FIG. 11 is a timing waveform diagram of the DC-DC converter 1 of FIG. 9, as an example different from FIG. 10. FIG. 11 shows the sawtooth wave signals, digital PID signal, and delay signal starting from the rising edge of the clock signal CLK. Note that each of Time t0, t1, t2, . . . , t15 shows the rising edge position of the clock signal CLK.

In FIG. 11, when load current decreases and the digital PID signal suddenly increases at Time t1, the phase controller 14 selects the first sawtooth wave signal having trailing edges. The first sawtooth wave signal is continuously selected until Time t6, at which load current increases again. At the time point of Time t1, the delay time from the rising edge of the clock signal CLK to the falling edge position of the PWM signal (Time ta1) is a little long, but after that, the delay time gradually decreases.

When load current increases and the digital PID signal suddenly decreases at Time t6, the phase controller 14 selects the second sawtooth wave signal having leading edges. The second sawtooth wave signal is continuously selected until Time t11, at which load current decreases again. At the time point of Time t6, the delay time from the rising edge of the clock signal CLK to the rising edge position of the PWM signal (Time ta6) is a little long, but after that, the delay time gradually decreases.

When load current decreases again and the digital PID signal suddenly increases at Time t11, the phase controller 14 selects the first sawtooth wave signal having trailing edges again, and the first sawtooth wave signal is continuously selected until Time t15. From Time t11 to t15, the delay time from the rising edge of the clock signal to the falling edge of the PWM signal gradually becomes short.

As stated above, in the sixth embodiment, the first delay unit 41 and the second delay unit 42 are arranged in the DPWM 15 to adjust the phases of the first sawtooth wave signal and the second sawtooth wave signal, which makes it possible to set the phases of the first and second sawtooth wave signals so that the delay time of the PWM signal becomes short.

(Seventh Embodiment)

A seventh embodiment explained below is different from the first embodiment in the input signal into the phase controller 14.

Figure 12:
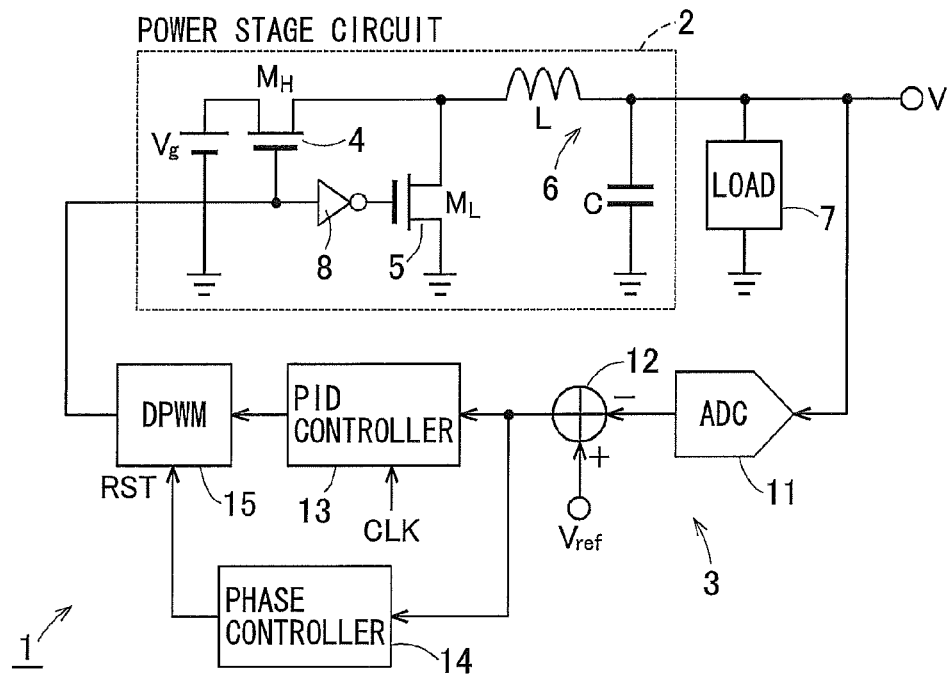
FIG. 12 is a block diagram showing the internal configuration of the DC-DC converter 1 according to a seventh embodiment.

FIG. 12 is a block diagram showing the internal configuration of the DC-DC converter 1 according to the seventh embodiment. The digital voltage difference signal outputted from the comparator 12 is inputted to the phase controller 14 in the DC-DC converter 1 of FIG. 12. Since the duty ratio of the PWM signal depends on the output voltage, the duty ratio also depends on the digital voltage difference signal. The phase controller 14 can control the phase of the PWM signal with high accuracy, based on the digital voltage difference signal.

Figure 13:
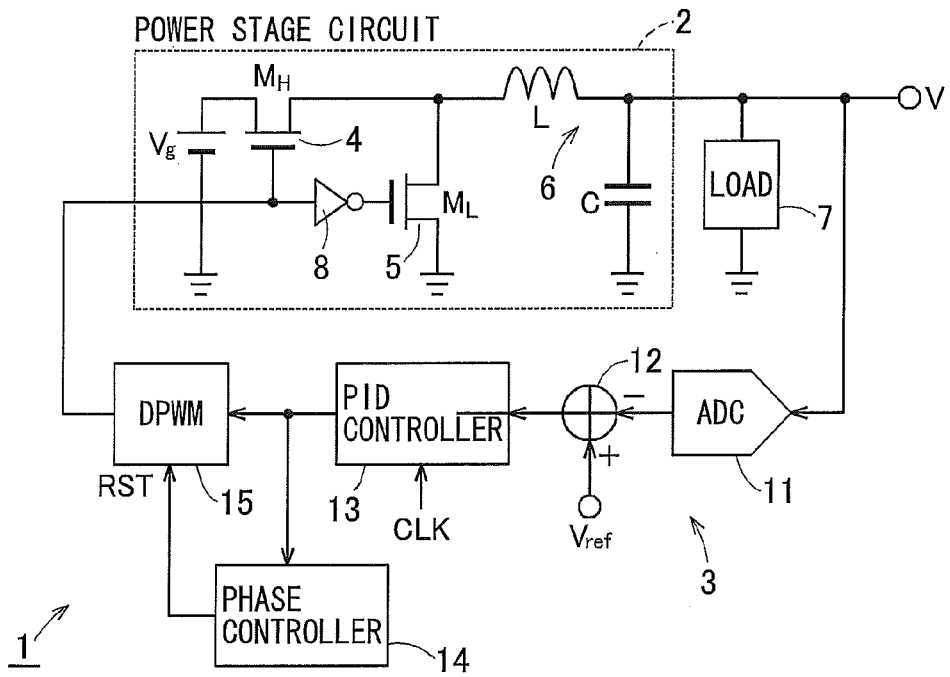
FIG. 13 is a block diagram showing the internal configuration of the DC-DC converter 1 according to a modification example of the seventh embodiment.

FIG. 13 is a block diagram showing the internal configuration of the DC-DC converter 1 according to a modification example of the seventh embodiment. The DC-DC converter 1 of FIG. 13 is different from FIG. 12 in the input signal into the phase controller 14. The digital PID signal outputted from the PID controller 13 is inputted to the phase controller 14 of FIG. 13. The digital PID signal is used to determine the duty of the PWM signal ratio, and depends on the output voltage. Therefore, the phase controller 14 can control the phase of the PWM signal with high accuracy also by using the digital PID signal.

As stated above, the input signal into the phase controller 14 may be any one selected from the digital output voltage signal outputted from the ADC 11, the digital voltage difference signal outputted from the comparator 12, and the digital PID signal outputted from the PID controller 13. Therefore, the input signal into the phase controller 14 shown in FIG. 1, FIG. 3, FIG. 8, and FIG. 9 may be any one of the above three kinds of signals.

Figure 14:
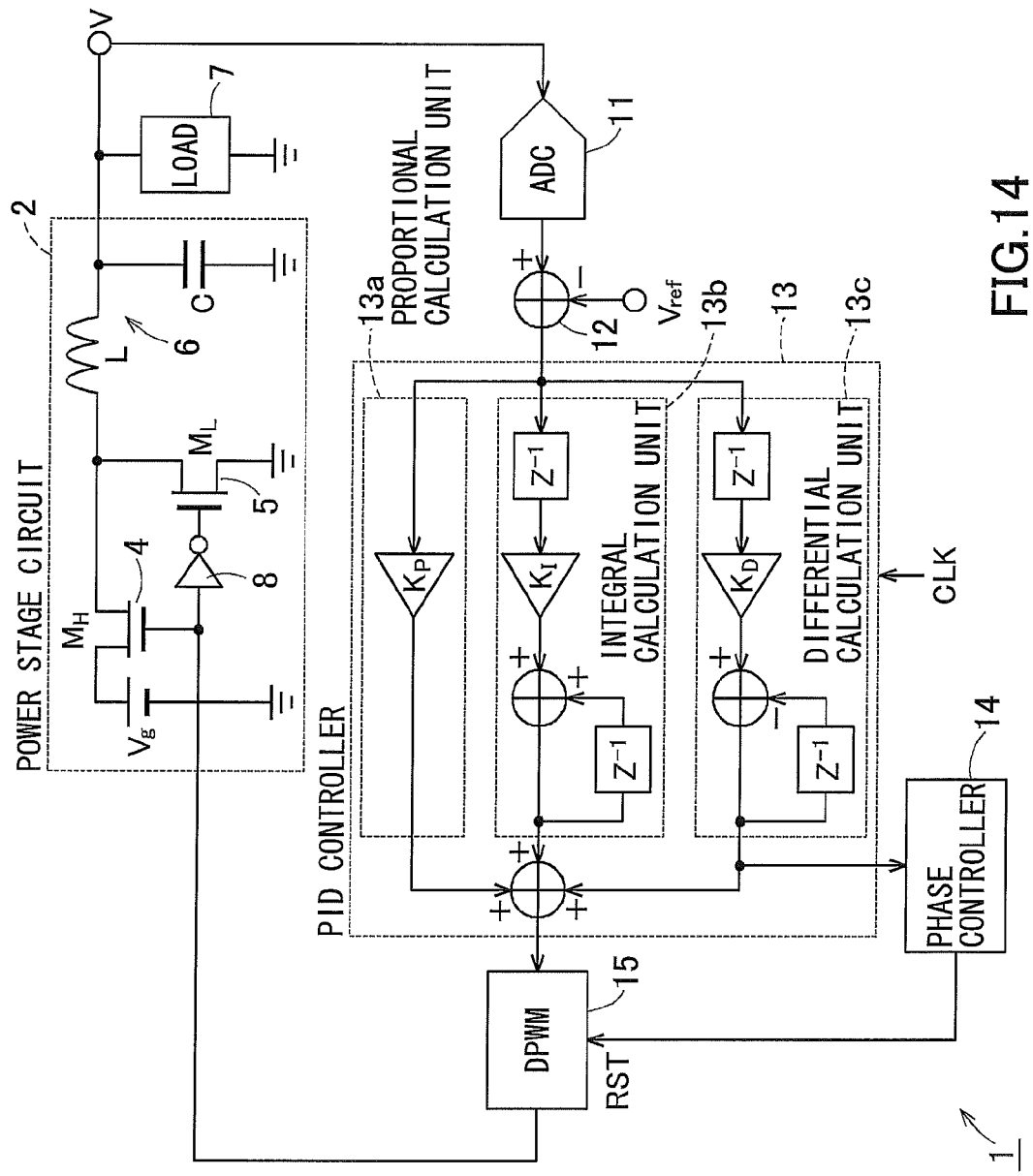
FIG. 14 is a block diagram showing the internal configuration of the DC-DC converter 1 in a more concrete manner than FIG. 13.

FIG. 14 is a block diagram showing the internal configuration of the DC-DC converter 1 in a more concrete manner than FIG. 13. The PID controller 13 of FIG. 14 has a proportional calculation unit 13*a*, an integral calculation unit 13*b*, a differential calculation unit 13*c*, and a synthesizer for generating the digital PID signal by synthesizing the output signals from these calculation units.

The proportional calculation unit 13*a* generates a proportional signal in proportion to the digital voltage difference signal. The integral calculation unit 13*b* generates an integral signal by integrating the digital voltage difference signal. The differential calculation unit 13*c* generates a differential signal of the digital voltage difference signal. The synthesizer generates the digital PID signal by synthesizing the proportional signal, integral signal, and differential signal.

Since load variation can be detected only by the differential signal, the phase controller 14 is inputted not with the digital PID signal but with the differential signal. The phase controller 14 controls the phase of the PWM signal by detecting whether load current has increased or decreased based on the differential signal.

As stated above, in the seventh embodiment, the phase controller 14 can control the phase of the PWM signal with high accuracy by using any one of the digital output voltage signal, the digital voltage difference signal, and the digital PID signal.

(Another Modification Example)

The DC-DC converter 1 shown in FIG. 3 has the ADC 16 between the DPWM 15 and the power stage circuit 2 to convert the digital PWM signal into an analog signal. However, in the DC-DC converter 1 shown in the other drawings, the ADC is omitted. Actually, the DC-DC converter 1 in each embodiment must have the ADC 16 arranged between the DPWM 15 and the power stage circuit 2.

In the DC-DC converter 1 shown in FIG. 8, FIG. 9, and FIG. 12 to FIG. 14, the DPWM 15 may be formed by using the digital ramp wave circuit 24 shown in FIG. 5, or by using the delay unit 27 shown in FIG. 7.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A control circuit of a DC-DC converter, the DC-DC converter generating a square wave voltage by periodically switching an input voltage based on a duty ratio depending on a pulse-width modulated signal, and converting this square wave voltage into a direct-current output voltage by a lowpass filter, the control circuit comprising:
a voltage difference signal generator configured to generate a digital voltage difference signal depending on a voltage difference between the output voltage and a reference voltage;
a PID controller configured to generate a digital PID signal for determining the duty ratio of the pulse-width modulated signal, based on the digital voltage difference signal;
a phase controller configured to generate a digital phase control signal for determining a phase of the pulse-width modulated signal, based on the digital voltage difference signal; and
a PWM generator configured to generate the pulse-width modulated signal, based on the digital PID signal and the digital phase control signal.

2. The control circuit of claim 1,
wherein the PWM generator generates the pulse-width modulated signal based on a signal level difference between the digital PID signal and any one of a first sawtooth wave signal having trailing edges and a second sawtooth wave signal having leading edges.

3. The control circuit of claim 2,
wherein the phase controller supplies the digital phase control signal to the PWM generator to instruct the PWM generator to select any one of the first sawtooth wave signal and the second sawtooth wave signal, depending on a variation in load current, and
the PWM generator generates the pulse-width modulated signal based on signal levels of the digital PID signal and any one of the first sawtooth wave signal and the second sawtooth wave signal instructed by the digital phase control signal.

4. The control circuit of claim 3,
the phase controller supplies the digital phase control signal to the PWM generator to instruct the PWM generator to select any one of the first sawtooth wave signal and the second sawtooth wave signal, based on a digital output voltage obtained by digitizing the output voltage, the digital voltage difference signal, or the digital phase control signal.

5. The control circuit of claim 2,
wherein the PWM generator comprises:
a first comparator configured to generate a first PWM candidate signal by comparing signal levels of the digital PID signal and the first sawtooth wave signal having trailing edges;
a second comparator configured to generate a second PWM candidate signal by comparing signal levels of the digital PID signal and the second sawtooth wave signal having leading edges; and
a PWM selector configured to select, as the pulse-width modulated signal, any one of the first PWM candidate signal and the second PWM candidate signal, based on the digital phase control signal.

6. The control circuit of claim 5,
wherein when the signal level of the digital PID signal rises due to a load variation, the PWM selector selects the first PWM candidate signal until the next load variation occurs, and when the signal level of the digital PID signal falls due to a load variation, the PWM selector selects the second PWM candidate signal until the next load variation occurs.

7. The control circuit of claim 6,
wherein the phase controller comprises:
a first threshold value comparator configured to generate a first threshold value comparative signal indicating whether the digital voltage difference signal or the digital PID signal is a first threshold value or greater;
a second threshold value comparator configured to generate a second threshold value comparative signal indicating whether the digital voltage difference signal or the digital PID signal is a second threshold value or less, the second threshold value being smaller than the first threshold value; and
a phase control signal generator configured to generate the digital phase control signal, based on the first threshold value comparative signal and the second threshold value comparative signal, and
when the first threshold value comparative signal is generated to indicate that the digital PID signal has become the first threshold value or greater due to a load variation, the PWM selector selects the first PWM candidate signal until the second threshold value comparative signal is generated to indicate that the digital PID signal has become the second threshold value or less due to the next load variation, and when the second threshold value comparative signal is generated to indicate that the digital PID signal has become the second threshold value or less due to a load variation, the PWM selector selects the second PWM candidate signal until the first threshold value comparative signal is generated to indicate that the digital PID signal has become the first threshold value or greater due to the next load variation.

8. The control circuit of claim 2,
wherein the PWM generator comprises:
a first sawtooth wave generator configured to generate the first sawtooth wave signal having trailing edges;
a second sawtooth wave generator configured to generate the second sawtooth wave signal having leading edges;
a sawtooth wave selector configured to select any one of the first sawtooth wave signal and the second sawtooth wave signal, based on the digital phase control signal; and a sawtooth wave comparator configured to generate the pulse-width modulated signal by comparing signal levels of the digital PID signal and any one of the first sawtooth wave signal and the second sawtooth wave signal selected by the sawtooth wave selector.

9. The control circuit of claim 8, wherein when the signal level of the digital PID signal rises due to a load variation, the sawtooth wave selector selects the first sawtooth wave signal until the next load variation occurs, and when the signal level of the digital PID signal falls due to a load variation, the sawtooth wave selector selects the second sawtooth wave signal until the next load variation occurs.

10. The control circuit of claim 9, wherein the phase controller comprises:
a first threshold value comparator configured to generate a first threshold value comparative signal indicating whether the digital voltage difference signal or the digital PID signal is a first threshold value or greater;
a second threshold value comparator configured to generate a second threshold value comparative signal indicating whether the digital voltage difference signal or the digital PID signal is a second threshold value or less, the second threshold value being smaller than the first threshold value; and
a phase control signal generator configured to generate the digital phase control signal, based on the first threshold value comparative signal and the second threshold value comparative signal, and
when the first threshold value comparative signal is generated to indicate that the digital PID signal has become the first threshold value or greater due to a load variation, the sawtooth wave selector selects the first sawtooth wave signal until the second threshold value comparative signal is generated to indicate that the digital PID signal has become the second threshold value or less due to the next load variation, and when the second threshold value comparative signal is generated to indicate that the digital PID signal has become the second threshold value or less due to a load variation, the sawtooth wave selector selects the second sawtooth wave signal until the first threshold value comparative signal is generated to indicate that the digital PID signal has become the first threshold value or greater due to the next load variation.

11. The control circuit of claim 8, wherein the PWM generator comprises:
a first delay unit configured to generate a first clock by shifting a phase of a clock signal for synchronizing the PID controller with the PWM generator by a first delay time; and
a second delay unit configured to generate a second clock signal by shifting a phase of the clock signal by a second delay time,
the first sawtooth wave generator generates the first sawtooth wave signal in synchronization with the first clock signal, and
the second sawtooth wave generator generates the second sawtooth wave signal in synchronization with the second clock signal.

12. The control circuit of claim 2, wherein the PWM generator comprises a digital counter configured to generate the first sawtooth wave signal or the second sawtooth wave signal, and
the digital counter clears a count value by the digital phase control signal, and after that, counts up or counts down from a predetermined initial value.

13. The control circuit of claim 1, wherein the PWM generator comprises:
a pulse generator configured to generate a pulse signal having a phase depending on the digital phase control signal;
a delay unit configured to delay the pulse signal to generate a plurality of pulse delay signals each having a different amount of delay;
a pulse selector configured to select one of the pulse delay signals, based on the digital PID signal; and
an edge detector configured to generate the pulse-width modulated signal by utilizing edges of the pulse signal and edges of the pulse delay signal selected by the pulse selector.

14. The control circuit of claim 1, wherein the PID controller comprises a differential calculation unit configured to detect a differential signal of the digital voltage difference signal, and
the phase controller generates the digital phase control signal based on the differential signal.

15. A DC-DC converter, comprising:
a power stage circuit; and
a control circuit configured to control the power stage circuit,
wherein the power stage circuit comprises:
a High-side switch and a Low-side switch each configured to generate a square wave voltage by periodically switching an input voltage based on a duty ratio depending on a pulse-width modulated signal; and
a lowpass filter configured to smooth the square wave voltage to generate an output voltage, and
the control circuit comprises:
a voltage difference signal generator configured to generate a digital voltage difference signal depending on a voltage difference between the output voltage and a reference voltage;
a PID controller configured to generate a digital PID signal for determining the duty ratio of the pulse-width modulated signal, based on the digital voltage difference signal;
a phase controller configured to generate a digital phase control signal for determining a phase of the pulse-width modulated signal, based on the digital voltage difference signal; and
a PWM generator configured to generate the pulse-width modulated signal, based on the digital PID signal and the digital phase control signal.

16. The DC-DC converter of claim 15, wherein the PWM generator generates the pulse-width modulated signal based on a signal level difference between the digital PID signal and any one of a first sawtooth wave signal having trailing edges and a second sawtooth wave signal having leading edges.

17. The DC-DC converter of claim 16, wherein the phase controller supplies the digital phase control signal to the PWM generator to instruct the PWM generator to select any one of the first sawtooth wave signal and the second sawtooth wave signal, depending on a variation in load current, and
the PWM generator generates the pulse-width modulated signal based on signal levels of the digital PID signal and any one of the first sawtooth wave signal and the second sawtooth wave signal instructed by the digital phase control signal.

18. The DC-DC converter of claim 17, the phase controller supplies the digital phase control signal to the PWM generator to instruct the PWM generator to select any one of the first sawtooth wave signal and the second sawtooth wave signal, based on a digital output voltage obtained by digitizing the output voltage, the digital voltage difference signal, or the digital phase control signal.

19. The DC-DC converter of claim 16,
wherein the PWM generator comprises:
a first comparator configured to generate a first PWM candidate signal by comparing signal levels of the digital PID signal and the first sawtooth wave signal having trailing edges;
a second comparator configured to generate a second PWM candidate signal by comparing signal levels of the digital PID signal and the second sawtooth wave signal having leading edges; and
a PWM selector configured to select, as the pulse-width modulated signal, any one of the first PWM candidate signal and the second PWM candidate signal, based on the digital phase control signal.

20. The DC-DC converter of claim 19,
wherein when the signal level of the digital PID signal rises due to a load variation, the PWM selector selects the first PWM candidate signal until the next load variation occurs, and when the signal level of the digital PID signal falls due to a load variation, the PWM selector selects the second PWM candidate signal until the next load variation occurs.

* * * * *